(12) United States Patent
Yokoyama et al.

(10) Patent No.: US 10,193,311 B2
(45) Date of Patent: *Jan. 29, 2019

(54) SPARK PLUG

(71) Applicant: NGK Spark Plug Co., LTD., Nagoya (JP)

(72) Inventors: Yutaka Yokoyama, Kasugai (JP); Kuniharu Tanaka, Komaki (JP); Nobuyoshi Araki, Nagoya (JP); Hirokazu Kurono, Nagoya (JP); Toshimasa Saji, Konan (JP); Yusuke Nomura, Niwa-gun (JP); Jumpei Isasa, Iwakura (JP)

(73) Assignee: NGK SPARK PLUG CO., LTD., Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/669,536

(22) Filed: Aug. 4, 2017

(65) Prior Publication Data

US 2018/0048126 A1 Feb. 15, 2018

(30) Foreign Application Priority Data

Aug. 9, 2016 (JP) .................................. 2016-156361

(51) Int. Cl.
| | |
|---|---|
| *C04B 35/10* | (2006.01) |
| *H01T 13/18* | (2006.01) |
| *H01T 13/38* | (2006.01) |
| *H01B 3/12* | (2006.01) |

(Continued)

(52) U.S. Cl.
CPC .............. *H01T 13/38* (2013.01); *C04B 35/10* (2013.01); *C04B 35/111* (2013.01);
(Continued)

(58) Field of Classification Search
CPC ........ H01T 13/38; C04B 35/10; C04B 35/111
See application file for complete search history.

(56) References Cited

U.S. PATENT DOCUMENTS

| 9,385,511 B2* | 7/2016 | Takeuchi .............. C04B 35/111 |
| 9,653,888 B2* | 5/2017 | Yokoyama ............. H01T 13/38 |

(Continued)

FOREIGN PATENT DOCUMENTS

| JP | 4544597 B | 9/2010 |
| JP | 4607253 B | 1/2011 |

(Continued)

*Primary Examiner* — Karl E Group
(74) *Attorney, Agent, or Firm* — Leason Ellis LLP

(57) ABSTRACT

An alumina-based sintered body includes 92 mass % to 96 mass % of Al in terms of an oxide, and at least three elements selected from Group II elements, one of the at least three elements being 1.90 mass % or more of Ba in terms of an oxide. The alumina-based sintered body includes the following phases in a grain boundary phase present between alumina crystal grains: a first crystal phase containing Si and at least one of the Group II elements, and a second crystal phase containing Al and at least one of the Group II elements. In X-ray diffraction of the alumina-based sintered body, the maximum relative intensity of the first crystal phase and the maximum relative intensity of the second crystal phase are both 2 or above relative to the maximum diffraction intensity of the alumina crystal.

2 Claims, 2 Drawing Sheets

(51) Int. Cl.
*C04B 35/111* (2006.01)
*C04B 35/626* (2006.01)
*C04B 35/634* (2006.01)

(52) U.S. Cl.
CPC .. *C04B 35/62655* (2013.01); *C04B 35/63416* (2013.01); *H01B 3/12* (2013.01); *C04B 2235/3206* (2013.01); *C04B 2235/3208* (2013.01); *C04B 2235/3213* (2013.01); *C04B 2235/3215* (2013.01); *C04B 2235/3217* (2013.01); *C04B 2235/3222* (2013.01); *C04B 2235/3418* (2013.01); *C04B 2235/3481* (2013.01); *C04B 2235/5436* (2013.01); *C04B 2235/5445* (2013.01); *C04B 2235/6565* (2013.01); *C04B 2235/6567* (2013.01); *C04B 2235/85* (2013.01)

(56) References Cited

U.S. PATENT DOCUMENTS

| | | |
|---|---|---|
| 2001/0004184 A1* | 6/2001 | Ito .......................... H01T 13/38 313/143 |
| 2010/0136867 A1 | 6/2010 | Kurono et al. |
| 2015/0207300 A1 | 7/2015 | Takeuchi et al. |
| 2017/0093134 A1 | 3/2017 | Yokoyama et al. |

FOREIGN PATENT DOCUMENTS

| | | |
|---|---|---|
| JP | 4748693 B | 8/2011 |
| JP | 4827110 B | 11/2011 |
| JP | 2014-44892 A | 3/2014 |
| JP | 2017-62879 A | 3/2017 |

\* cited by examiner

SPARK PLUG

This application claims the benefit of Japanese Patent Application No. 2016-156361, filed Aug. 9, 2016, which is incorporated herein by reference in its entirety.

FIELD OF THE INVENTION

The present invention relates to a spark plug, and more specifically, to a spark plug having an insulator that can attain an enhanced withstand voltage performance.

BACKGROUND OF THE INVENTION

A spark plug used in an internal combustion engine has an insulator that includes, for example, an alumina-based sintered body containing alumina as a main component. An alumina-based sintered body is generally formed by sintering a powder mixture containing sintering aids including $SiO_2$, MgO, and the like (for example, Japanese Unexamined Patent Application Publication No. 2014-44892). In such an alumina-based sintered body, the sintering aids are mainly contained in glass that is present at alumina crystal grain boundaries. Such glass is present as a low melting point glass phase. In consideration of a problem that the low melting point glass phase is softened in an environment at about 700° C. and the withstand voltage performance of the insulator decreases, Japanese Unexamined Patent Application Publication No. 2014-44892 specifies appropriate insulator materials.

Technical Problem

There has been a demand for a further enhancement over the above technique in terms of the withstand voltage performance in a still higher temperature environment (for example, 900° C. and above).

The present invention has been made in order to meet such demands. It is therefore an object of the invention to provide a spark plug having an insulator that can attain an enhancement in withstand voltage performance in a higher temperature environment.

SUMMARY OF THE INVENTION

Solution to Problem

To achieve the above object, a spark plug described in the first embodiment includes an insulator that includes an alumina-based sintered body containing an alumina crystal. The alumina-based sintered body includes 92 mass % to 96 mass % of Al in terms of an oxide, and at least three elements selected from Group II elements in the periodic table based on IUPAC Recommendations 1990, one of the at least three elements being 1.90 mass % or more of Ba in terms of oxide. The alumina-based sintered body includes, in a grain boundary phase present between grains of the alumina crystal, a first crystal phase containing Si and at least one of the Group II elements, and a second crystal phase containing Al and at least one of the Group II elements, with the proviso that a crystal phase containing Si and a crystal phase containing Mg as a sole Group II element are excluded from the second crystal phase. In an X-ray diffraction of the alumina-based sintered body, the maximum relative intensity of the first crystal phase and the maximum relative intensity of the second crystal phase are both 2 or above relative to the maximum diffraction intensity of the alumina crystal.

A spark plug described in the second embodiment is such that the first crystal phase and the second crystal phase in the first embodiment contain Ba as a main component of the Group II element(s).

Advantageous Effects of Invention

The first crystal phase contains a Si component that readily forms glass with a low melting point, and consequently the amount of low melting point glass present in the grain boundary phase is relatively decreased. The second crystal phase present in the grain boundary phase divides a conductive path defined by softened glass. Consequently, the withstand voltage performance at high temperatures can be effectively enhanced.

BRIEF DESCRIPTION OF THE DRAWINGS

These and other features and advantages of the present invention will become more readily appreciated when considered in connection with the following detailed description and appended drawings, wherein like designations denote like elements in the various views, and wherein.

DETAILED DESCRIPTION OF THE INVENTION

Figure 1:
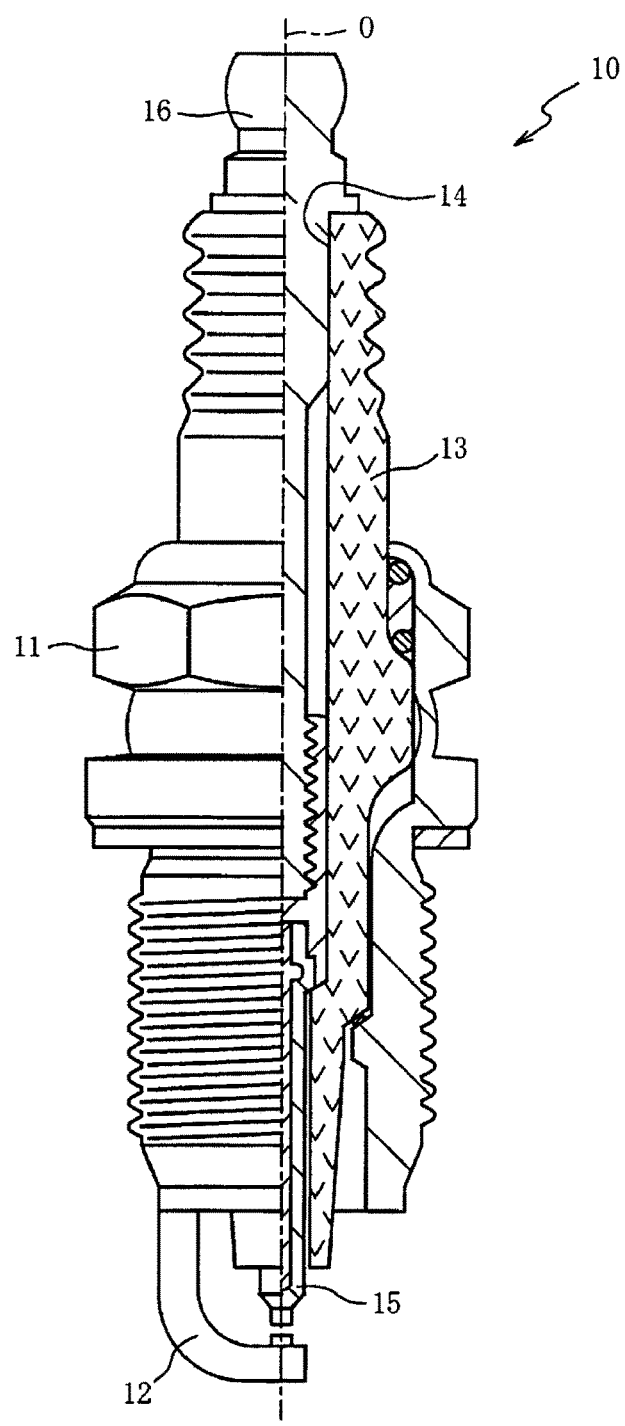
FIG. 1 is a sectional view of a spark plug according to an embodiment of the present invention.

Preferred embodiments of the present invention will be described below with reference to the appended drawings. FIG. 1 is a sectional view of a spark plug 10, along with its axial line O, that includes an insulator 13 according to an embodiment of the present invention. In FIG. 1, the lower side of the paper is referred to as a front end side of the spark plug 10, and the upper side of the paper as a rear end side of the spark plug 10. As illustrated in FIG. 1, the spark plug 10 includes a metal shell 11, a ground electrode 12, an insulator 13, and a center electrode 15.

The metal shell 11 is a substantially cylindrical member to be fixed in a screw hole (not shown) of an internal combustion engine, and is formed of a conductive metal material (for example, low-carbon steel or the like). The ground electrode 12 is a rod-shaped member that is made of a metal (for example, a nickel-based alloy) and is joined to the metal shell 11.

The insulator 13 is a substantially cylindrical member that includes an alumina-based sintered body having excellent mechanical characteristics and high-temperature insulation properties, and the metal shell 11 is fixed to an outer peripheral portion thereof. The insulator 13 has an axial hole 14 which penetrates the insulator along the axial line O. The center electrode 15 is a rod-shaped metal electrode that is inserted into the axial hole 14 and is held on the front end side of the insulator 13. The center electrode 15 is opposed to the ground electrode 12 via a spark gap.

A metal terminal 16 is a rod-shaped member to which a high-voltage cable (not shown) is to be connected, and is formed of a conductive metal material (for example, low-carbon steel or the like). The metal terminal 16 is attached to the insulator 13, and the front end side of the metal terminal 16 is disposed within the axial hole 14. The metal terminal 16 is electrically connected to the center electrode 15 within the axial hole 14.

The alumina-based sintered body that forms the insulator 13 contains an Al component, a Si component, and at least three elements selected from Group II elements in the periodic table wherein one of the at least three elements is a Ba component. Further, the alumina-based sintered body includes, in a grain boundary phase present between alumina crystal grains, a first crystal phase and a second crystal phase (described later). The grain boundary phase refers to crystals other than alumina crystal and amorphous substances (hereinafter, also referred to as glass) that are present between alumina crystal grains.

The content of the Al component in the alumina-based sintered body is 92 mass % to 96 mass % in terms of oxide relative to the mass of the alumina-based sintered body (in terms of oxide) taken as 100 mass %. By controlling the content of the Ai component to fall in this range, sinterability can be ensured and a good withstand voltage performance can be obtained. The Al component is mainly present as alumina in the alumina-based sintered body, and is also found in the first crystal phase and the second crystal phase.

The alumina-based sintered body contains a Si component. The Si component is an element derived from a sintering aid, and is present in the sintered body in the forms of, for example, oxides and ions. The Si component is melted to usually form a liquid phase during sintering and serves as a sintering aid that promotes the densification of the sintered body. Further, the Si component, after sintering, forms structures such as glass and the first crystal phase in the grain boundary phase present between alumina crystal grains.

From the viewpoint of availability, Mg, Ca, Sr, and Ba are preferable as the Group II elements contained in the alumina-based sintered body. The Group II elements are elements derived from sintering aids, and are present in the alumina-based sintered body in the forms of, for example, oxides and ions. During sintering, the Group II elements serve as sintering additives that promote the densification of the sintered body. At least three Group II elements are included, which makes it possible to ensure the sinterability of the alumina-based sintered body.

One of the at least three Group II elements is a Ba component, and the content thereof is 1.90 mass % or more in terms of oxide relative to the mass of the alumina-based sintered body (in terms of oxide) taken as 100 mass %. By controlling the content of the Ba component to fall in this range, it is possible to promote the crystallization of the grain boundary phase and to suppress the formation of glass in the grain boundary phase that is easily softened at high temperatures.

The first crystal phase includes a crystal containing Si and at least one element selected from Group II elements, as essential elements. Examples of the first crystal phases include $CaAl_2Si_2O_8$, $Ca_2Al_2SiO_7$, $BaAl_2Si_2O_8$, and $SrAl_2Si_2O_8$.

These composition formulae are typical examples, and examples further include those crystals having a composition that deviates from the stoichiometric ratio. The first crystal phase may contain a plurality of Group II elements. The first crystal phase may include one, or two or more such Group II elements. Because the first crystal phase includes Si that readily forms low melting point glass, the amount of glass in the grain boundary phase that is easily softened at high temperatures can be decreased relatively by the amount in which the first crystal phase precipitates in the grain boundary phase.

The first crystal phase is preferably one such as $BaAl_2Si_2O_8$ containing Ba as a main component of the Group II element(s). This is because in the $Al_2O_3$—$SiO_2$-Group II element oxide systems, the Group II elements tend to offer a narrower glass-forming region (the oxides tend to be crystallized more easily) in the order of Ca, Sr, Ba, and Mg, and Ba is precipitated more easily than Mg into a crystal phase containing Si. Because Ba easily forms a crystal phase together with Si which readily forms low melting point glass, the amount of Si-containing glass can be relatively decreased easily.

The second crystal phase includes a crystal containing Al and at least one element selected from Group II elements, as essential elements. Examples of the second crystal phases include $BaAl_{12}O_{19}$, $SrAl_{12}O_{19}$, and $CaAl_{12}O_{19}$. These composition formulae are typical examples, and examples further include those crystals having a composition that deviates from the stoichiometric ratio. The second crystal phase may contain a plurality of Group II elements. The second crystal phase may include one, or two or more such Group II elements.

The second crystal phase is a relatively large plate-like crystal having a major diameter of about 0.2 to 3 μm, and thus divides a conductive path defined by softened glass in the grain boundary phase. Because the amount of glass in the grain boundary phase can be decreased by the first crystal phase and a conductive path defined by softened glass can be divided by the second crystal phase, the withstand voltage performance of the insulator 13 at high temperatures can be enhanced.

Crystal phases that contain Si, and crystal phases that contain Mg as the only Group II element (for example, $MgAl_2O_4$) are excluded from the second crystal phase. Crystal phases containing Si are excluded because such Si-containing crystal phases belong to the first crystal phase. Crystal phases containing Mg as the only Group II element are excluded because such crystals containing Mg as the only Group II element are spherical and poorly serve to divide a conductive path defined by softened glass in the grain boundary phase.

The second crystal phase is preferably one containing Ba as a main component of the Group II element(s), such as $BaAl_{12}O_{19}$. This is because such a second crystal phase that contains Ba is crystallized easily and thus promotes the crystallization of the grain boundary phase, thereby contributing to enhancing the withstand voltage performance of the insulator 13 at high temperatures.

In X-ray diffraction of the insulator 13 with respect to a cross section or a polished face of the alumina-based sintered body that forms the insulator 13, the relative intensity of the maximum diffraction intensity B of the first crystal phase is 2 or above relative to the maximum diffraction intensity A of the alumina crystal. Similarly, the relative intensity of the maximum diffraction intensity C of the second crystal phase is 2 or above relative to the maximum diffraction intensity A of the alumina crystal. These configurations are adopted to ensure the contents of the first crystal phase and the second crystal phase relative to the alumina crystal and to enhance the withstand voltage performance of the insulator 13 at high temperatures.

The diffraction intensities of the alumina crystal, the first crystal phase, and the second crystal phase may be measured by an X-ray diffraction method as follows. Any cross section or polished face of the insulator 13 is irradiated with X-ray, and an X-ray diffraction pattern is obtained. The X-ray diffraction pattern obtained is compared to an X-ray diffraction pattern of a known substance, and thereby the crystal phases (the alumina crystal, the first crystal phase, and the second crystal phase) are identified.

The diffraction intensity A of the diffraction line with the highest intensity among the plurality of diffraction lines of the alumina crystal is measured. The highest diffraction intensity B among the plurality of diffraction lines of the first crystal phase is measured. The highest diffraction intensity C among the plurality of diffraction lines of the second crystal phase is measured. The diffraction intensities are determined from peak profiles of the diffraction lines after removal of the background. By use of the diffraction intensities A and B, the maximum relative intensity of the first crystal phase may be determined from B/A×100. By use of the diffraction intensities A and C, the maximum relative intensity of the second crystal phase may be determined from C/A×100.

When the first crystal phase or the second crystal phase includes a plurality of substances (for example, when the first crystal phase includes $CaAl_2Si_2O_8$ and $BaAl_2Si_2O_8$), the maximum relative intensities of the respective substances are measured and the sum of such intensities is used as the relative intensity of the first crystal phase or the relative intensity of the second crystal phase.

Next, methods for producing an insulator 13 and a spark plug 10 will be described in detail. Powders of raw materials for the insulator 13, namely, a powder of an Al compound as a main component, a powder of a Si compound, and powders of Group II element compounds, as well as a binder and a solvent are mixed together to give a slurry. Additives such as a plasticizer, an anti-foaming agent, and a dispersant may be added as appropriate. The mixing of the raw material powders is preferably performed for 8 hours or more so that the raw material powders can be mixed uniformly and that the obtainable sintered body can attain a high denseness.

The Al compound powder is not particularly limited as long as the compound is converted into alumina ($Al_2O_3$) by sintering. An alumina powder is usually used. Because a Na component is sometimes present as a practically inevitable impurity in an Al compound powder, it is preferable to use a highly pure Al compound powder. For example, the purity of the Al compound powder is preferably not less than 99.5%.

To obtain a dense alumina-based sintered body, it is usually recommended to use an Al compound powder which has an average particle size of 0.1 to 5.0 μm. This average particle size is a value measured by a laser diffraction method (grain size distribution analyzer MICROTRAC (MT-3000) manufactured by Nikkiso Co., Ltd.).

To attain a good withstand voltage performance, the Al compound powder is preferably prepared so that the content thereof in terms of oxide will be 92 mass % to 96 mass % of the mass of the alumina-based sintered body (in terms of oxide) after sintering taken as 100 mass %.

The Si compound powder is not particularly limited as long as the compound can be converted into Si oxide by sintering. Examples of the Si compound powder include various inorganic powders such as oxides, complex oxides, hydroxides, carbonate salts, chlorides, sulfate salts, and nitrate salts of silicon, and natural mineral powders. When a powder other than oxides is used as the Si compound powder, the amount of the powder used is grasped as the mass % of the compound converted into oxide. The purity and average particle size of the Si compound powder are basically similar to those of the Al compound powder.

The Group II compound powder is not particularly limited as long as the compound can be converted into a Group II element oxide by sintering. Examples of the Group II compound powder include various inorganic powders such as oxides, complex oxides, hydroxides, carbonate salts, chlorides, sulfate salts, and nitrate salts of Group II elements, and natural minerals. When a powder other than oxides is used as the Group II compound powder, the amount of the powder used is grasped as the mass % of the compound converted into oxide. The purity and average particle size of the Group II compound powder are basically similar to those of the Al compound powder.

The binder may be any binder which can enhance the formability of the raw material powders. An example of such binders is hydrophilic binders. Examples of the hydrophilic binders include polyvinyl alcohols, water-soluble acrylic resins, gum arabic, and dextrins. The binders may be used singly, or two or more may be used in combination.

It is preferable to use a binder that contains a small amount of Na and K components so as to avoid inhibiting the crystallization of the first crystal phase and the second crystal phase. The binder is preferably added in a ratio of 0.1 to 7 parts by mass, and particularly preferably in a ratio of 1 to 5 parts by mass per 100 parts by mass of the raw material powders.

The solvent may be any solvent that can disperse the raw material powders. Examples of such solvents include water and alcohols. The solvents may be used singly, or two or more may be used in combination. The solvent is preferably used in a ratio of 40 to 120 parts by mass, and particularly preferably 50 to 100 parts by mass per 100 parts by mass of the raw material powders.

The slurry obtained as described above is spray dried by a method such as a spray drying method to form spherical granules. The average particle size of the granules is preferably 30 to 200 μm, and particularly preferably 50 to 150 μm. This average particle size is a value measured by a laser diffraction method (grain size distribution analyzer MICROTRAC (MT-3000) manufactured by Nikkiso Co., Ltd.).

Next, the granules are molded by pressing with a device such as, for example, a rubber press or a metal mold press to form a molded article. The article obtained is shaped by grinding the outer face thereof with a resinoid wheel or the like. The method for forming an article is not limited to press molding, and other forming methods such as injection molding may be naturally adopted.

The article shaped to a desired shape is sintered in an air atmosphere at 1450 to 1650° C. for 1 to 8 hours, cooled to 1200° C. at a cooling rate of 5 to 30° C./min, and thereafter naturally cooled to room temperature, thus giving an alumina-based sintered body. When the sintering temperature is 1450 to 1650° C., sufficient densification of the sintered body is facilitated and the abnormal grain growth of alumina is unlikely to occur. Consequently, the withstand voltage performance and mechanical strength of the obtainable alumina-based sintered body can be ensured.

When the sintering time is 1 to 8 hours, sufficient densification of the sintered body is facilitated and the abnormal grain growth of alumina is unlikely to occur. Consequently, the dielectric strength performance and mechanical strength of the obtainable alumina-based sintered body can be ensured. When the average rate of cooling from the sintering temperature to 1200° C. is 30° C./min or less, the first crystal phase and the second crystal phase are precipitated easily in the grain boundary phase, and the obtainable alumina-based sintered body can attain good withstand voltage performance. The alumina-based sintered body may be further processed as required to adjust its shape or the like. An insulator 13 is produced in the manner described above.

Separately, an electrode material such as a Ni-based alloy is worked to a predetermined shape and size to form a ground electrode 12 and a center electrode 15. The ground electrode 12 is joined by a method such as resistance welding to a metal shell 11 formed by working such as plastic working into a predetermined shape and size. The center electrode 15 and a metal terminal 16 are assembled with the insulator 13 by a known method, and the insulator 13 is assembled with the metal shell 11 joined with the ground electrode 12. A tip portion of the ground electrode 12 is folded toward the center electrode 15 so that the tip of the ground electrode 12 is opposed to the tip of the center electrode 15. A spark plug 10 is thus manufactured.

EXAMPLES

The present invention will be described further in detail based on examples, but it should be construed that the present invention is in no way limited to those examples.

(Production of Alumina-based Sintered Body)

An alumina ($Al_2O_3$) powder, a $SiO_2$ powder as a Si compound powder, and powders of carbonate salts of Ba, Ca, and Mg as powders of Group II element compounds were provided as raw material powders. The average particle sizes of these powders were 0.2 to 2.1 μm. These raw material powders were mixed together in various ratios, and the mixed powders were mixed together with a polyvinyl alcohol as a binder and water as a solvent to give slurries.

The slurries obtained were spray dried by a method such as a spray drying method to form spherical granules having an average particle size of about 100 μm. The granules obtained were press molded to give various circular disk-shaped articles and bottomed cylindrical articles. These articles were sintered in an air atmosphere at a sintering temperature in the range of 1450° C. to 1650° C. for a sintering time of 1 to 8 hours, cooled from the sintering temperature to 1200° C. under constant conditions where the average cooling rate was in the range of 5 to 30° C./min, and naturally cooled to room temperature.

In the manner described above, circular disk-shaped alumina-based sintered bodies (for analysis of components) with a diameter of 18 mm and a thickness of 0.3 to 0.5 mm were obtained from Samples No. 1 to 30, and bottomed cylindrical alumina-based sintered bodies (for measurement of withstand voltage) were obtained from Samples No. 1 to 30.

(Component Analysis)

The circular disk-shaped alumina-based sintered bodies (for analysis of components) were analyzed by fluorescent X-ray spectroscopy to determine their compositions, namely, the contents of components. The contents of components were calculated as the mass proportions (%) assuming that the total mass of the detected components converted to oxides were 100 mass %. As a result, the contents (calculated values) of the components shown in Table 1 substantially agreed with the proportions in which the raw material powders had been mixed.

TABLE 1

| No | Composition of alumina-based sintered body (mass %) | | | | | Crystal phase (*) | | | Relative intensity | | withstand voltage | Evaluation |
|---|---|---|---|---|---|---|---|---|---|---|---|---|
| | $Al_2O_3$ | $SiO_2$ | MgO | BaO | CaO | First | Second | Other | First | Second | | |
| 1 | 94.48 | 2.23 | 0.14 | 2.36 | 0.79 | V | X | — | 6 | 3 | 51 | C |
| 2 | 94.68 | 2.27 | 0.13 | 1.91 | 1.01 | U | X | — | 11 | 3 | 54 | C |
| 3 | 94.50 | 2.35 | 0.28 | 2.35 | 0.52 | TV | X | Z | 6 | 2 | 52 | C |
| 4 | 94.00 | 2.14 | 0.14 | 3.43 | 0.29 | UV | X | — | 19 | 5 | 56 | B |
| 5 | 94.24 | 2.18 | 0.14 | 2.89 | 0.55 | UV | X | — | 10 | 4 | 57 | B |
| 6 | 93.79 | 1.93 | 0.13 | 3.83 | 0.32 | UV | X | — | 10 | 7 | 57 | B |
| 7 | 93.01 | 2.50 | 0.16 | 4.00 | 0.33 | UV | X | — | 22 | 7 | 56 | B |
| 8 | 93.79 | 1.93 | 0.13 | 3.83 | 0.32 | UV | X | — | 18 | 9 | 57 | B |
| 9 | 93.69 | 1.70 | 0.14 | 3.94 | 0.53 | UV | X | — | 13 | 12 | 58 | A |
| 10 | 93.22 | 1.25 | 0.13 | 4.78 | 0.61 | UV | X | — | 8 | 24 | 58 | A |
| 11 | 93.45 | 1.65 | 0.13 | 4.49 | 0.28 | UV | X | — | 18 | 17 | 58 | A |
| 12 | 93.60 | 1.46 | 0.14 | 4.01 | 0.79 | UV | X | — | 10 | 17 | 58 | A |
| 13 | 93.13 | 1.38 | 0.13 | 5.08 | 0.28 | UV | X | — | 17 | 24 | 59 | A |
| 14 | 93.39 | 1.38 | 0.27 | 4.45 | 0.51 | UV | X | — | 11 | 20 | 59 | A |
| 15 | 93.34 | 1.44 | 0.07 | 4.62 | 0.53 | UV | X | — | 11 | 21 | 59 | A |
| 16 | 93.44 | 1.50 | 0.17 | 4.41 | 0.48 | UV | X | — | 13 | 18 | 60 | A |
| 17 | 93.54 | 1.30 | 0.14 | 4.05 | 0.97 | UV | X | — | 2 | 19 | 56 | B |
| 18 | 93.38 | 1.28 | 0.14 | 4.41 | 0.79 | UV | X | — | 5 | 21 | 57 | B |
| 19 | 94.29 | 2.05 | 0.14 | 2.70 | 0.82 | UV | X | — | 4 | 7 | 55 | B |
| 20 | 93.67 | 1.62 | 0.14 | 3.94 | 0.64 | UV | X | — | 6 | 13 | 56 | B |
| 21 | 93.98 | 1.76 | 0.14 | 3.26 | 0.85 | UW | X | — | 15 | 9 | 55 | B |
| 22 | 95.37 | 2.42 | 0.11 | 0.34 | 1.75 | — | Y | — | 0 | 5 | 43 | D |
| 23 | 95.26 | 2.96 | 0.84 | 0.79 | 0.15 | — | — | Z | 0 | 0 | 20 | D |
| 24 | 93.99 | 2.01 | 0.00 | 3.43 | 0.57 | V | X | — | 16 | 4 | 26 | D |
| 25 | 94.90 | 2.42 | 0.26 | 1.46 | 0.97 | U | — | Z | 11 | 0 | 49 | D |
| 26 | 94.93 | 2.63 | 0.51 | 1.45 | 0.48 | V | — | — | 4 | 0 | 36 | D |
| 27 | 94.71 | 2.49 | 0.40 | 1.90 | 0.50 | V | — | — | 6 | 0 | 38 | D |
| 28 | 94.70 | 2.38 | 0.27 | 1.91 | 0.74 | V | — | — | 6 | 0 | 39 | D |
| 29 | 94.91 | 2.53 | 0.39 | 1.45 | 0.72 | UV | — | — | 12 | 0 | 42 | D |
| 30 | 87.94 | 6.87 | 0.25 | 1.90 | 3.04 | T | — | — | 2 | 0 | 18 | D |

(*) Symbols of crystal phase indicate the following composition formulae (typical).

T: $CaAl_2Si_2O_8$
U: $BaAl_2Si_2O_8$ (high-temperature phase)
V: $BaAl_2Si_2O_8$ (low-temperature phase)
W: $Ca_2Al_2SiO_7$
X: $BaAl_{12}O_{19}$
Y: $CaAl_{12}O_{19}$
Z: $MgAl_2O_4$ (X-ray Diffraction)

The circular disk-shaped alumina-based sintered bodies (for analysis of components) were subjected to a polishing treatment, and cross sections of the alumina-based sintered bodies were analyzed by X-ray diffraction using an X-ray diffractometer (model: Smart Lab) manufactured by Rigaku Corporation under measuring conditions of X-ray: CuKα (λ 1.54 Å), X-ray output: 40 kV-30 mA, scanning speed (counting time): 5.0, sampling width: 0.02 deg, entrance slit: ½ deg, receiving slit (1): 15.000 mm, and receiving slit (2): 20.000 mm.

The X-ray diffraction patterns obtained were compared to JCPDS cards, for example, and the crystal phases were identified. As a result, the alumina-based sintered bodies were confirmed to contain a first crystal phase, a second crystal phase, and other crystal phase shown in Table 1, in their grain boundary phase.

The symbols T, U, V, and W in a column of crystal phase in Table 1 indicate compounds which are shown in the margin of Table 1 and which belong to the first crystal phase. The symbols X and Y in a column of crystal phase in Table 1 indicate compounds which are shown in the margin of Table 1 and which belong to the second crystal phase. The symbol Z in a column of crystal phase in Table 1 indicates a compound which is shown in the margin of Table 1 and which does not belong to the first crystal phase or the second crystal phase (which is other compound).

The diffraction intensities of peaks in the X-ray diffraction pattern were determined by analyzing the data with use of data analysis software PEAK SEARCH manufactured by Rigaku Corporation under conditions of smoothing: weighted average (11 smoothing points) and background removal (peak width threshold 0.10, intensity threshold 0.01).

The relative intensity (B/A×100) of the highest diffraction intensity B among the plurality of diffraction lines of the first crystal phase to the highest diffraction intensity A among the plurality of diffraction lines of the alumina crystal was measured. Similarly, the relative intensity (C/A×100) of the highest diffraction intensity C among the plurality of diffraction lines of the second crystal phase to the highest diffraction intensity A among the plurality of diffraction lines of the alumina crystal was measured. The relative intensities of the first crystal phase and the second crystal phase are shown in Table 1.

When the first crystal phase contained a plurality of compounds as was the case in Sample No. 3 (T and V in Sample No. 3), the relative intensity of the highest diffraction intensity among the plurality of diffraction lines was measured with respect to each of the compounds, and the sum of the relative intensities was used as the relative intensity of the first crystal phase.

(Withstand Voltage Test)

Figure 2:
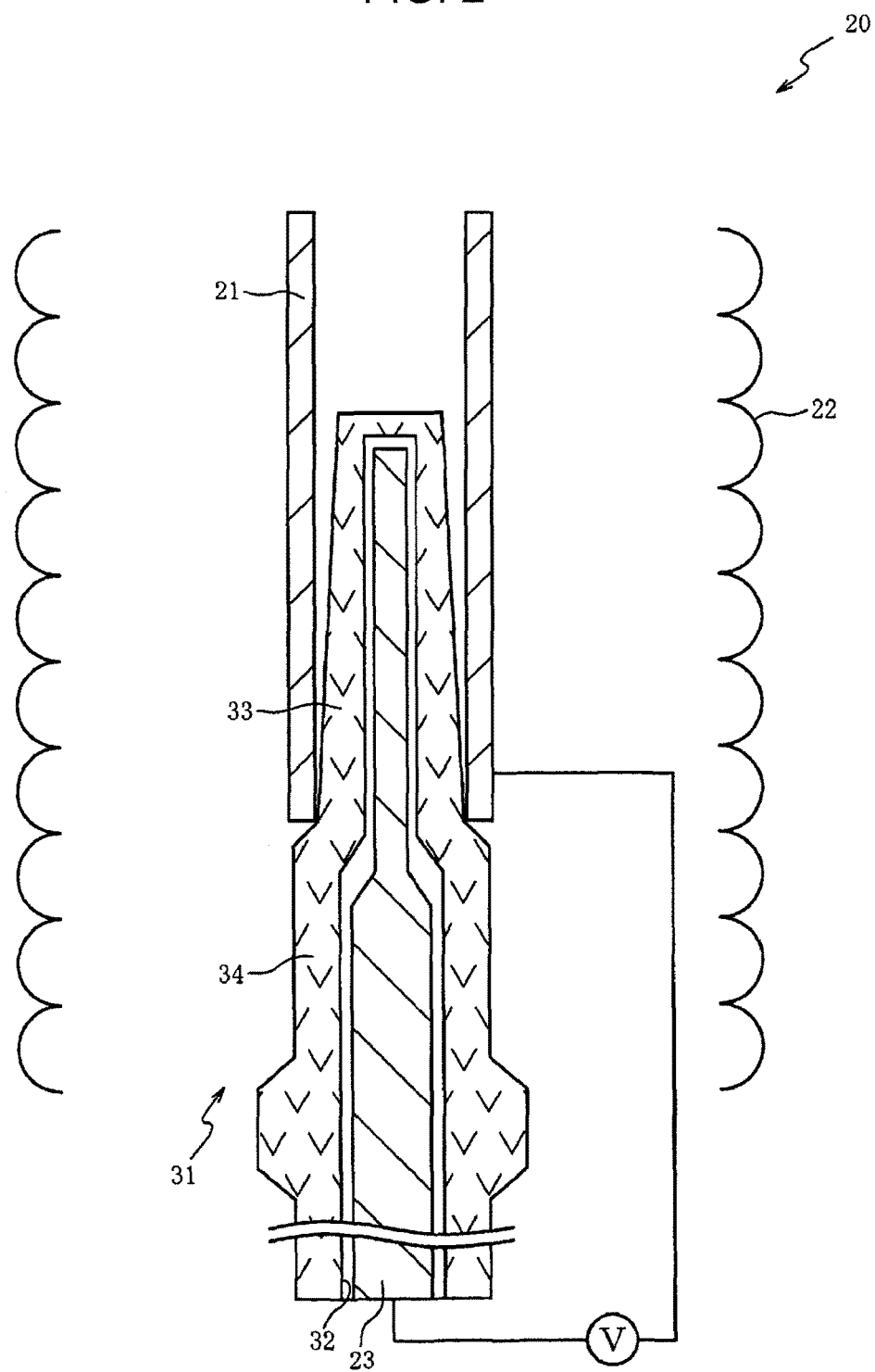
FIG. 2 is a sectional view of a dielectric strength measuring device.

The bottomed cylindrical alumina-based sintered bodies 31 (for measurement of withstand voltage) of Samples No. 1 to 30 were tested to determine high-temperature withstand voltage at 900° C. by using a withstand voltage testing device 20 illustrated in FIG. 2. FIG. 2 is a sectional view of the dielectric strength testing device 20.

As illustrated in FIG. 2, the alumina-based sintered body 31 has an axial hole 32 in the center in the axial line direction. The end of the axial hole 32 is closed. The alumina-based sintered body 31 has a cylindrical small-diameter portion 33 which includes the closed end of the axial hole 32, and a cylindrical large-diameter portion 34 having an outer diameter larger than the small-diameter portion 33. The small-diameter portion 33 and the large-diameter portion 34 are connected to each other in the axial line direction. The dielectric strength measuring device 20 includes a metal annular member 21, a heater 22 for heating the annular member 21, and a rod-shaped electrode 23 configured to apply a high voltage between the annular member 21 and the electrode 23. The electrode 23 is made of a Ni alloy.

The electrode 23 was inserted from the opening of the axial hole 32 of the alumina-based sintered body 31 to the end of the axial hole 32, and the annular member 21 was arranged so that an inner peripheral face of the annular member 21 was in contact with an outer peripheral face near the boundary between the small-diameter portion 33 and the large-diameter portion 34 of the alumina-based sintered body 31. While maintaining this state, the withstand voltage of the alumina-based sintered body 31 was measured.

Specifically, while maintaining the temperature around the alumina-based sintered body 31 at 900° C. by performing heating with the heater 22, a voltage was applied between the annular member 21 and the electrode 23. The voltage was increased at a rate of 1.5 kV/sec, and the value of voltage was read when a dielectric breakdown occurred in the alumina-based sintered body 31, that is, when the alumina-based sintered body 31 was punctured and the voltage was no longer increased.

The alumina-based sintered body 31 after dielectric breakdown was removed from the withstand voltage testing device 20, and the thickness of the portion punctured by the dielectric breakdown was measured from the outer peripheral surface of the alumina-based sintered body 31 to the axial hole 32. The withstand voltage (kV/mm) was determined by dividing the value of voltage which caused the dielectric breakdown by the thickness. The results are shown in Table 1.

In this test, the samples were evaluated as Good ("C") when the withstand voltage was 50 kV/mm to less than 55 kV/mm, Very Good ("B") when the dielectric strength was 55 kV/mm to less than 58 kV/mm, Excellent ("A") when the dielectric strength was 58 kV/mm or more, and Poor ("D") when the withstand voltage was less than 50 kV/mm.

As shown in Table 1, Samples No. 1 to 21 contained an Al component in an amount of 92 mass % to 96 mass % in terms of oxide, a Ba component in an amount of 1.90 mass % or more in terms of oxide, three Group II elements (Mg, Ba, and Ca), a first crystal phase and a second crystal phase. In Samples No. 1 to 21, the relative intensities of the first crystal phase and the second crystal phase measured by X-ray diffractometry were both 2 or more, and the withstand voltage were not less than 50 kV/mm (evaluated as "A", "B" or "C").

In contrast, the withstand voltage was less than 50 kV/mm (evaluated as "D") in Samples No. 22, 23, 25, 26, and 29 in which the content of the Ba component was less than 1.90 mass % in terms of oxide, Sample No. 24 which contained only two Group II elements (Ba and Ca), Samples No. 27 and 28 which did not contain any second crystal phase, and Sample No. 30 in which the content of Al was less than 92 mass % in terms of oxide.

One of the first crystal phase and second crystal phase was not detected in Samples No. 22 to 30 except Samples Nos. 23 and 24. In these samples, it is assumed that the crystallization of the grain boundary phase was insufficient and thus the withstand voltage was low due to an influence of glass remaining in the grain boundary phase.

Sample No. 23 had a low withstand voltage probably because the content of $SiO_2$ serving as an origin of a glass phase was large while the amount of BaO having high crystallizability among Group II elements was small, and consequently the precipitation of both the first crystal phase and second crystal phase did not occur.

In Sample No. 24, the relative intensities of the first crystal phase and the second crystal phase were not less than 2. However, the withstand voltage was low probably because MgO was absent and the alumina crystal failed to attain denseness.

In contrast, Samples No. 1 to 21 attained a withstand voltage of not less than 50 kV/mm. In particular, the withstand voltage was not less than 55 kV/mm (evaluated as "A" or "B") in Samples No. 4 to 21 in which the relative intensity of the first crystal phase was not less than 2 and the relative intensity of the second crystal phase was not less than 4. Further, the withstand voltage was not less than 58 kV/mm (evaluated as "A") in Samples No. 9 to 16 in which the relative intensity of the first crystal phase was not less than 8 and the relative intensity of the second crystal phase was not less than 12.

From these examples, it has been shown that the withstand voltage performance at a high temperature of 900° C. can be enhanced when the sintered body contains an Al component in an amount of 92 mass % to 96 mass % in terms of oxide, at least three Group II elements, a Ba component as one of the Group II elements in an amount of 1.90 mass % or more in terms of oxide, a first crystal phase and a second crystal phase, and when the relative intensities of the first crystal phase and the second crystal phase measured by X-ray diffractometry are 2 or above.

While the above examples have illustrated the test results of insulators containing three Group II elements (Mg, Ba, and Ca), it is assumed that similar test results will be obtained also when the insulators contain four Group II elements (for example, Mg, Ca, Sr, and Ba) or more.

While the present invention has been described above based on embodiments, it can be easily appreciated that the present invention is in no way limited to the embodiments discussed above and various improvements and modifications are possible without departing from the spirit of the present invention.

The spark plug 10 in which the tip of the insulator 13 is disposed farther on the rear end side than the tip of the center electrode 15 (the center electrode 15 extends beyond the axial hole 14) has been described in the above embodiments. However, the spark plug 10 is not necessarily limited thereto. The insulator 13 described hereinabove can be naturally applied also to the production of a spark plug in which the tip of the center electrode 15 is accommodated within the axial hole 14 of the insulator 13.

The spark plug 10 in which the tip of the insulator 13 extends beyond the tip of the metal shell 11 has been described in the above embodiments. However, the spark plug 10 is not necessarily limited thereto. The insulator 13 described hereinabove can be naturally applied also to the production of a spark plug in which the tip of the insulator 13 is accommodated within the metal shell 11 (the tip of the metal shell 11 extends beyond the tip of the insulator 13).

REFERENCE SIGNS LIST

10: spark plug
13: insulator

The invention claimed is:
1. A spark plug comprising:
an insulator comprising an alumina-based sintered body containing an alumina crystal, wherein
the alumina-based sintered body includes 92 mass % to 96 mass % of Al in terms of an oxide, and at least three elements selected from Group II elements in the periodic table based on IUPAC Recommendations 1990, one of the at least three elements being 1.90 mass % or more of Ba in terms of an oxide,
the alumina-based sintered body includes the following phases in a grain boundary phase present between grains of the alumina crystal;
a first crystal phase containing Si and at least one of the Group II elements, and
a second crystal phase containing Al and at least one of the Group II elements, with the proviso that a crystal phase containing Si and a crystal phase containing Mg as a sole Group II element are excluded from the second crystal phase, and
in an X-ray diffraction of the alumina-based sintered body, the maximum relative intensity of the first crystal phase and the maximum relative intensity of the second crystal phase are both 2 or above relative to the maximum diffraction intensity of the alumina crystal.
2. The spark plug according to claim 1, wherein the first crystal phase and the second crystal phase contain Ba as a main component.

* * * * *